US008332122B2

(12) United States Patent
Tanaka et al.

(10) Patent No.: US 8,332,122 B2

(45) Date of Patent: Dec. 11, 2012

(54) CONTROL APPARATUS FOR VEHICLE DRIVE UNIT

(75) Inventors: Hiroyuki Tanaka, Susono (JP); Junichi Kako, Susono (JP); Kaoru Ohtsuka, Mishima (JP); Shinichi Soejima, Gotenba (JP); Keisuke Kawai, Odawara (JP); Naoto Kato, Susono (JP); Hayato Nakada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 285 days.

(21) Appl. No.: 12/669,902

(22) PCT Filed: Jul. 8, 2008

(86) PCT No.: PCT/JP2008/062320

§ 371 (c)(1), (2), (4) Date: Jan. 20, 2010

(87) PCT Pub. No.: WO2009/025128

PCT Pub. Date: Feb. 26, 2009

(65) Prior Publication Data

US 2010/0191406 A1 Jul. 29, 2010

(30) Foreign Application Priority Data

Aug. 21, 2007 (JP) ................................ 2007-215037

(51) Int. Cl.
*G06F 17/00* (2006.01)

(52) U.S. Cl. ....................................................... 701/101

(58) Field of Classification Search .................... 701/29, 701/101

See application file for complete search history.

(56) References Cited

U.S. PATENT DOCUMENTS 5,351,776 A * 10/1994 Keller et al. .................... 701/70
6,141,618 A * 10/2000 Yamashita et al. .............. 701/84
2003/0143957 A1* 7/2003 Lyon ............................ 455/67.1

(Continued)

FOREIGN PATENT DOCUMENTS

JP A-5-85228 4/1993
JP A-10-250416 9/1998

(Continued)

OTHER PUBLICATIONS

International Search Report for International Application No. PCT/JP2008/062320, issued on Sep. 22, 2008 (w/ its English language version).
International Preliminary Report on Patentability for International Application No. PCT/JP2008/062320, mailed on May 20, 2010.

*Primary Examiner* — Mary Cheung
*Assistant Examiner* — Michael D Lang
(74) *Attorney, Agent, or Firm* — Oliff & Berridge, PLC

(57) ABSTRACT

A control apparatus for a vehicle drive unit including a control structure of a hierarchical type having a demand generation level, a mediation level, and a control variable setting level and a signal is transmitted in one direction from a higher level of hierarchy to a lower level of hierarchy. The demand generation level includes demand output elements for each capability. The mediation level includes mediation elements, each corresponding to a classified category of demands. Each of the mediation elements collects demand values of the category of which the mediation elements are in charge and performs mediation according to a rule to arrive at a single demand value. The control variable setting level includes an adjuster portion adjusting each of the mediated demand values based on a relationship between each other and control variable calculation elements calculating a control variable of each of a plurality of actuators based on the adjusted demand value.

11 Claims, 5 Drawing Sheets

U.S. PATENT DOCUMENTS

| | | | | |
|---|---|---|---|---|
| 2006/0122752 | A1* | 6/2006 | Ishio et al. | 701/48 |
| 2007/0142987 | A1* | 6/2007 | Takamatsu et al. | 701/41 |
| 2007/0293992 | A1* | 12/2007 | Kuwahara et al. | 701/1 |
| 2008/0208420 | A1* | 8/2008 | Wozniak et al. | 701/54 |

FOREIGN PATENT DOCUMENTS

| | | |
|---|---|---|
| JP | A-2006-307702 | 11/2006 |
| JP | A-2007-113514 | 5/2007 |
| WO | WO 2007/049784 A1 | 5/2007 |

* cited by examiner

CONTROL APPARATUS FOR VEHICLE DRIVE UNIT

TECHNICAL FIELD

The present invention relates, in general, to control apparatuses for vehicle drive units and, in particular, to a control apparatus that achieves demands related to capabilities of various types of a vehicle drive unit through coordinated control of a plurality of actuators.

BACKGROUND ART

Known techniques related to control of vehicle drive units include those disclosed, for example, in JP-A-10-250416 (hereinafter referred to as Patent Document 1) and JP-A-5-85228 (hereinafter referred to as Patent Document 2).

The technique disclosed in Patent Document 1 includes a generator source generating, for example, mechanical resources and thermal resources, a consumer portion consuming these resources, and an adjuster portion disposed therebetween, the adjuster portion adjusting a relation between an amount of resources supplied by the generator source and an amount of resources consumed by the consumer portion. More specifically, the adjuster portion inquires the amount of resources supplied of the generator source and the amount of resources consumed of the consumer portion, respectively, for collection to thereby determine allocation of the resources to each consumer portion before determining the amount of resources supplied at the generator source and the amount of resources consumed at the consumer portion.

The technique disclosed in Patent Document 2, on the other hand, includes a control structure of a hierarchical structure, in which a driver's demand disposed at a highest level of the hierarchy is transmitted in one direction only to an actuator of each of various running capabilities disposed at a lowest level of the hierarchy.

DISCLOSURE OF THE INVENTION

Problems to be Solved by the Invention

In accordance with the technique of Patent Document 1, the adjuster portion can appropriately achieves demands from the plurality of consumer portions by carrying out communications with the generator source and the consumer portion. There is, however, a need for performing communications several times, including an inquiry from the adjuster portion, a response to the inquiry, and notification of the amount of resources generated and that after determination of allocation to the consumer portions, which imposes a tremendous amount of operational load on a computer. Typically, a control apparatus for a vehicle drive unit performs a plurality of tasks parallel and it is desirable that an operational load required for executing a single task be as small as possible.

In contrast, in accordance with the technique of Patent Document 2, signals are transmitted in one direction only from an upper level of hierarchy to a lower level of hierarchy, so that there is only a small amount of operational load on the computer. The technique of Patent Document 2 can, however, achieve only one demand (that from the driver) and is not arranged to achieve a plurality of demands. A vehicle drive unit has a plurality of demands to be achieved related to capabilities, such as drivability and fuel economy. Simply superposing one demand on top of another does not allow each actuator to operate properly. Then, the demands may not be achieved sufficiently and operation of the vehicle drive unit may be deteriorated.

The present invention has been made to solve the foregoing problems and it is an object of the present invention to provide a control apparatus for a vehicle drive unit that can achieve demands related to various capabilities of the vehicle drive unit appropriately without allowing an operational load of a computer to be increased.

Means to Solve the Problem

In order to attain the object described above, a first aspect of the present invention is a control apparatus for a vehicle drive unit achieving demands related to various types of capabilities of a vehicle drive unit by coordinately controlling a plurality of actuators related to operations of the vehicle drive unit, the control apparatus having a control structure of a hierarchical type, the control structure comprising:

a demand generation level;

a mediation level disposed on a level lower than the demand generation level; and a control variable setting level disposed on a level lower than the mediation level, signals being transmitted in one direction from a higher level of hierarchy to a lower level of hierarchy, wherein: the demand generation level includes, for each of the capabilities of the vehicle drive unit, a demand output element outputting a demand related to a corresponding capability of the vehicle drive unit;

the mediation level includes a mediation element for each of predetermined classified categories of demands, each mediation element collecting, of demand values outputted from the demand generation level, demand values of a category of which the mediation element is in charge and performing mediation according to a predetermined rule to arrive at a single demand value; and the control variable setting level includes an adjuster portion adjusting each of the demand values mediated by the mediation level based on a relationship between each other and a control variable calculation element calculating a control variable of each of the plurality of actuators based on the demand value adjusted by the adjuster portion.

A second aspect of the present invention is the control apparatus for the vehicle drive unit according to the first aspect of the present invention, wherein the control variable calculation element is provided for each of the actuators.

A third aspect of the present invention is the control apparatus for the vehicle drive unit according to the first or second aspect of the present invention, further comprising a common signal delivery system delivering a common signal parallel to each of the levels, wherein signals related to operating conditions and operating states of the vehicle drive unit being delivered through the common signal delivery system.

A fourth aspect of the present invention is the control apparatus for the vehicle drive unit according to any one of the first to the third aspects of the present invention, wherein: the demand output element is structured to output the demand related to a corresponding capability of the vehicle drive unit expressed in any of a predetermined plurality of physical quantities related to operations of the vehicle drive unit; and the mediation element is provided for each of the physical quantities and structured to collect, of the demand values outputted from the demand generation level, a demand value expressed in the physical quantity of which the mediation element is in charge.

A fifth aspect of the present invention is the control apparatus for the vehicle drive unit according to the fourth aspect of the present invention, wherein: the vehicle drive unit is an internal combustion engine; and the plurality of physical quantities is torque, efficiency, and an air-fuel ratio.

A sixth aspect of the present invention is the control apparatus for the vehicle drive unit according to the fifth aspect of the present invention, wherein the adjuster portion adjusts, of a torque demand value, an efficiency demand value, and an air-fuel ratio demand value mediated by the mediation level, the efficiency demand value or the air-fuel ratio demand value.

A seventh aspect of the present invention is the control apparatus for the vehicle drive unit according to the fifth or sixth aspect of the present invention, wherein the various types of capabilities include a capability related to drivability, a capability related to an exhaust gas, and a capability related to fuel economy.

An eighth aspect of the present invention is the control apparatus for the vehicle drive unit according to any one of the fifth to the seventh aspects of the present invention, wherein the plurality of actuators include an actuator adjusting an amount of intake air of the internal combustion engine, an actuator adjusting ignition timing of the internal combustion engine, and an actuator adjusting a fuel injection amount of the internal combustion engine.

A ninth aspect of the present invention is the control apparatus for the vehicle drive unit according to any one of the first to the eighth aspects of the present invention, wherein: a priority order is previously established between at least two demand values of a plurality of demand values mediated by the mediation level; and the adjuster portion adjusts at least one demand value in ascending order of the priority order such that a relationship among the plurality of demand values used for calculation of the control variable by the control variable calculation element is one that permits proper operations of the vehicle drive unit.

A tenth aspect of the present invention is the control apparatus for the vehicle drive unit according to the ninth aspect of the present invention, wherein the vehicle drive unit offers a plurality of operating modes to choose from and the priority order is changed according to the selected operating mode.

An eleventh aspect of the present invention is the control apparatus for the vehicle drive unit according to the tenth aspect of the present invention, wherein the adjuster portion includes a guard limiting an upper limit and/or a lower limit of the demand value to be adjusted and a limiting range of each guard is changed according to the priority order of each demand value to be adjusted.

Effects of the Invention

According to the first aspect of the invention, the demand outputted from the demand generation level on the highest level of hierarchy is transmitted in one direction to the control variable setting level on the lowest level of hierarchy. Because there is no exchange of signals involved between higher and lower levels of hierarchy, an operational load of a computer can be reduced. Additionally, each of the demand values transmitted to the control variable setting level is adjusted based on the relationship between each other and the control variable of each actuator is calculated based on the adjusted demand value. The actuator can therefore be coordinated to ensure that operations of the vehicle drive unit are not deteriorated regardless of whatever demand is outputted by the demand generation level. Specifically, according to the first invention, the plurality of demands related to the various types of capabilities can be appropriately achieved without allowing the operational load of the computer to be increased.

Further, in accordance with the first aspect of the invention, if a capability of the vehicle drive unit is to be added, a demand output element corresponding to the new capability is added to the demand generation level and connected to a mediation element into which the demand value thereof is categorized. Signals are transmitted from the demand generation level to the mediation level in one direction and, moreover, no signals are transmitted between the elements within the same level of hierarchy at the demand generation level. The addition of the new demand output element does not therefore change the design of other elements. The demand value outputted from the added demand output element and those outputted from other demand output elements are collected and mediated to a single demand value by the mediation elements.

According to the second aspect of the invention, if an actuator to be used for controlling the vehicle drive unit is to be added, it is simply necessary that a control variable calculation element corresponding to the new actuator be added to the control variable setting level and connected to the adjuster portion. Signals are transmitted from the adjuster portion to each of the control variable calculation elements in one direction and, moreover, no signals are transmitted between the control variable calculation elements. The addition of the new control variable calculation element does not therefore result in the design of other elements being changed.

According to the third aspect of the invention, the control variable of each actuator can be determined by referring to the operating conditions and operating states of the vehicle drive unit. Each actuator can therefore be even more precisely operated toward achieving the demand. In addition, signals related to the operating conditions and operating states of the vehicle drive unit are delivered parallel relative to each level of hierarchy. This helps prevent signal transmission load between the levels of hierarchy from increasing.

According to the fourth aspect of the invention, the demand is expressed in any of the predetermined physical quantities, which allows the demand to be collected and mediated for each physical quantity. The control variable of each actuator is calculated based on the mediated demand value. If the demand is expressed using a physical quantity related to an operation of the vehicle drive unit, the demand can be precisely reflected in the operation of each actuator. Specifically, the demand related to each capability of the vehicle drive unit can be easily achieved.

If the vehicle drive unit is an internal combustion engine, the output thereof may be torque, heat, and exhaust gas and these outputs are related with various capabilities of the internal combustion engine. In addition, parameters for controlling these outputs can be collected to three different types of physical quantities: specifically, torque, efficiency, and air-fuel ratio. Accordingly, if the vehicle drive unit is the internal combustion engine, preferably, the demands related to capabilities thereof are represented using the three types of physical quantities of the torque, the efficiency, and the air-fuel ratio.

According to the fifth aspect of the invention, the demands related to the various types of capabilities of the internal combustion engine are represented by the three types of physical quantities of torque, efficiency, and air-fuel ratio and the control variable of each actuator is calculated based on the torque demand value, the efficiency demand value, and the air-fuel ratio demand value. The operation of each actuator can therefore be controlled such that the demand is reflected in the output of the internal combustion engine.

According to the sixth aspect of the invention, while accurate torque control is being performed, other demands related to the efficiency and the air-fuel ratio can be achieved as much as feasible.

According to the seventh aspect of the invention, the demands related to drivability, exhaust gas, and fuel economy that are capabilities of the internal combustion engine can be easily achieved. The demand related to the drivability can be expressed, for example, in torque or efficiency. The demand related to the exhaust gas can be expressed, for example, in efficiency or air-fuel ratio. The demand related to the fuel economy can be expressed, for example, in torque or the air-fuel ratio.

According to the eighth aspect of the invention, the demand related to each of the capabilities of the internal combustion engine can be easily achieved by controlling the amount of intake air, the ignition timing, and the fuel injection amount. The amount of intake air can be calculated based on the torque demand value and the efficiency demand value. The ignition timing can be calculated based on the torque demand value. The fuel injection amount can be calculated based on the air-fuel ratio demand value. Note, however, that the demand value forms one piece of information used for calculating the control variable and information related to the operating conditions and operating states of the internal combustion engine (for example, estimated torque and speed) may be used, in addition to the demand values, to calculate the control variable.

According to the ninth aspect of the invention, a demand value having a high priority is directly reflected in the control variable of the actuator and a demand value having a low priority is adjusted before being reflected in the control variable of the actuator. This allows the demand having the low priority to be achieved as much as feasible, while achieving the demand having the high priority reliably within a range in which proper operations of the vehicle drive unit can be performed.

According to the tenth aspect of the invention, the priority order of achieving the demands can be changed according to the operating mode of the vehicle drive unit, so that the demand having a high priority in the selected operating mode can be achieved reliably, while that having a low priority can be achieved as much as feasible.

According to the eleventh aspect of the invention, the magnitude of the demand value can be easily adjusted by changing the limiting range of the guard limiting the upper limit and/or the lower limit of the demand value.

DESCRIPTION OF NOTATIONS

Figure 1:
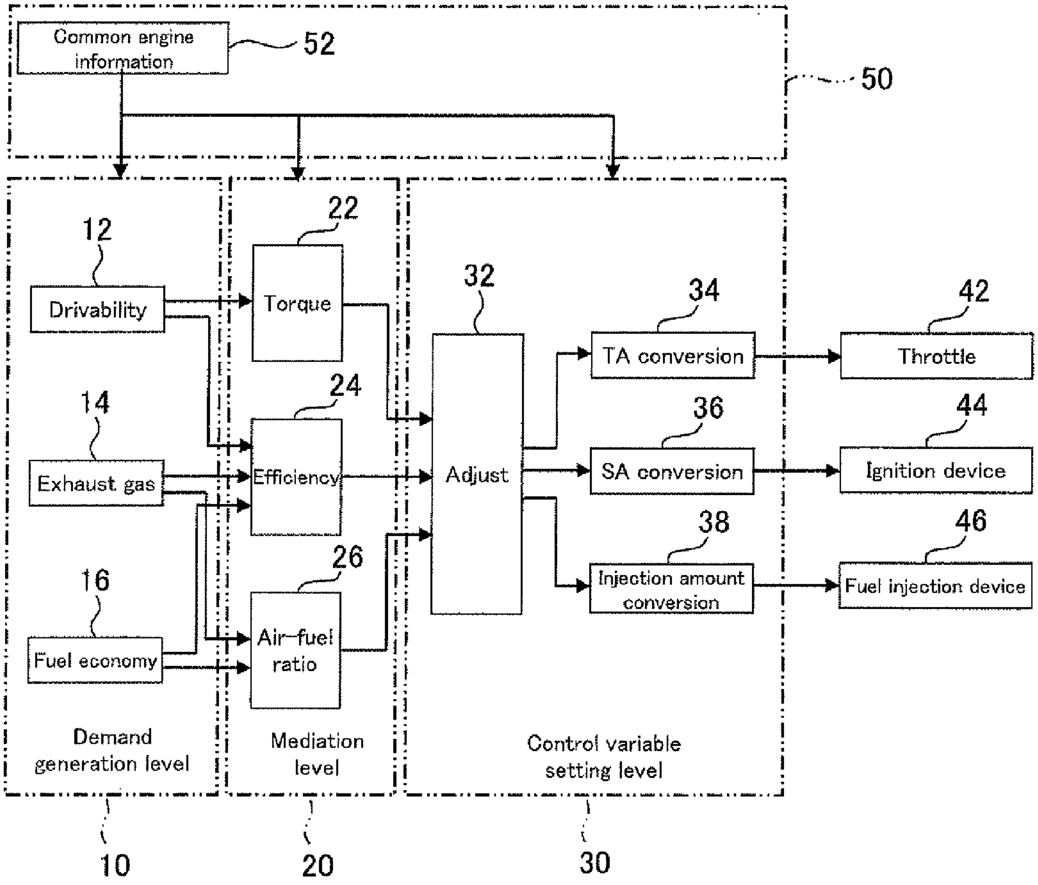
FIG. 1 is a block diagram illustrating the configuration of an engine control apparatus according to a first embodiment of the present invention.

10, 100 demand generation level
12, 14, 16, 112, 114, 116, 118, 120 demand output element
20, 102 mediation level
22, 24, 26, 122, 124, 126, 128 mediation element
30, 104 control variable setting level
32, 132 adjuster portion
34, 36, 38, 134, 136, 138, 140, 142, 146 control variable calculation element
42, 44, 46, 152, 154, 156, 158, 160, 162 actuator
50, 106 common signal delivery system
52 information source
202 superposition element
204, 212, 216, 220 minimum value selection element
214, 218 maximum value selection element
302, 314, 316 guard
304 map for selecting upper/lower limit values of efficiency
308, 322 selector part
312 torque efficiency calculator part (divider part)
320 map for selecting upper/lower limit values of air-fuel ratio

BEST MODES FOR CARRYING OUT THE INVENTION

First Embodiment

A first embodiment of the present invention will be described below with reference to drawings. The first embodiment of the present invention will be described, in which the control apparatus of the present invention is applied to an internal combustion engine (hereinafter referred to as the "engine") mounted on an automobile, specifically, a spark ignition type engine. The present invention is nonetheless applicable to any type of engine other than the spark ignition type, for example, a diesel engine and a vehicle drive unit other than the engine, such as a hybrid system including an engine and an electric motor.

An engine control apparatus in the first embodiment of the present invention is structured as shown by a block diagram of FIG. 1. FIG. 1 shows various elements of the control apparatus in blocks and transmission of signals between the blocks by arrows. Arrangements and characteristics of the control apparatus according to the embodiment will be described below with reference to FIG. 1. To enable an even deeper understanding of the characteristics of this embodiment, detailed drawings may be used as necessary for the description of the embodiment.

Referring to FIG. 1, the control apparatus has a control structure of a hierarchical type including three levels of hierarchy 10, 20, and 30. The control structure includes, in sequence from a highest level to a lowest level of hierarchical levels, a demand generation level 10, a mediation level 20, and a control variable setting level 30. Actuators of various types 42, 44, and 46 are connected to the control variable setting level 30 on the lowest level of hierarchy. A signal flows in one direction only between the levels 10, 20, and 30 of the control apparatus, and the signal is transmitted from the demand generation level 10 to the mediation level 20 and from the mediation level 20 to the control variable setting level 30. The control apparatus further includes a common signal delivery system 50 that is disposed independently of these levels 10, 20, and 30 and delivers a common signal parallel to each of the levels 10, 20, and 30.

Signals transmitted between the levels 10, 20, and 30 differ from those delivered from the common signal delivery system 50 as follows. Specifically, the signals transmitted between the levels 10, 20, and 30 are converted from demands related to capabilities of the engine and eventually translated to corresponding control variables for the actuators 42, 44, and 46. In contrast, the signals delivered from the common signal delivery system 50 include information required when the demands are generated or the control variables are calculated: specifically, information on operating conditions and operating states of the engine (for example, engine speed, amount of intake air, estimated torque, current actual ignition timing, coolant temperature, valve timing, and operating mode). Sources of these types of information 52 include sensors of various types disposed on the engine and an internal estimation capability of the control apparatus. The information of these types is common engine information shared among the levels 10, 20, and 30. Accordingly, delivering the information parallel to each of the levels 10, 20, and 30 will not only help reduce a volume of communications among the levels 10, 20, and 30, but also retain simultaneity of information among the levels 10, 20, and 30.

Arrangements of each of the levels 10, 20, and 30 and processing performed therein will be described in detail below in descending order of hierarchical levels.

The demand generation level 10 includes a plurality of demand output elements 12, 14, and 16 disposed therein. "Demand" as the term is herein used means that which is related to a capability of the engine. Each of the demand output elements 12, 14, and 16 is dedicated to a corresponding capability of the engine. Engine capabilities include drivability, exhaust gas, fuel economy, noise, and vibration, to name a few. These may be said to be performance required for the engine. Different demand output elements need to be disposed in the demand generation level 10 depending on what is demanded from the engine and what should be given top priority. In this embodiment, the demand output element 12 is provided to correspond to the capability related to the drivability, the demand output element 14 is provided to correspond to the capability related to the exhaust gas, and the demand output element 16 is provided to correspond to the capability related to the fuel economy.

The demand output elements 12, 14, and 16 output numerical values that represent the demands related to the engine capabilities. The control variable of the actuators 42, 44, and 46 are determined through arithmetic operations, so that the demands are quantified to allow the demands to be reflected in the control variables of the actuators 42, 44, and 46. In this embodiment, the demands are expressed by a physical quantity related to an operation of the engine. Subjective judgments are involved in classifying the capabilities; however, expressing the demands with such physical quantities enables objective quantification in classifying the capabilities by eliminating the subjective judgments, so that the demands can be precisely reflected in the operation of the actuators 42, 44, and 46.

Additionally, in this embodiment, only the following three types of physical quantities are used in expressing the demands: torque, efficiency, and air-fuel ratio. Engine outputs (outputs in the broad sense of the term) are torque, heat, and exhaust gas (heat and components). These outputs are related to the engine capabilities of drivability, exhaust gas, and fuel economy mentioned earlier. Parameters for controlling these outputs may be collected to the three types of physical quantities of torque, efficiency, and air-fuel ratio. It is accordingly considered possible to reflect the demands precisely in the engine outputs by expressing the demands using the three types of physical quantities of torque, efficiency, and air-fuel ratio and thereby controlling the operation of the actuators 42, 44, and 46.

In FIG. 1, though only typically, the demand output element 12 outputs the demand related to drivability using a demand value expressed in torque or efficiency. For example, if the demand is acceleration of a vehicle, that particular demand can be expressed in torque. If the demand is to prevent engine stalling, that particular demand can be expressed in efficiency (increased efficiency).

The demand output element 14 outputs the demand related to exhaust gas using a demand value expressed in efficiency or air-fuel ratio. For example, if the demand is to warm a catalyst, that particular demand can be expressed in efficiency (decreased efficiency) or air-fuel ratio. The decreased efficiency can increase an exhaust gas temperature and the air-fuel ratio can set an ambience in which the catalyst is easy to react.

The demand output element 16 outputs the demand related to fuel economy using a demand value expressed in efficiency or air-fuel ratio. For example, if the demand is to increase combustion efficiency, that particular demand can be expressed in efficiency (increased efficiency). If the demand is to reduce pump loss, that particular demand can be expressed in air-fuel ratio (lean burn).

Note that the demand value outputted from each of the demand output elements 12, 14, and 16 is not limited to one for each physical quantity. For example, the demand output element 12 outputs not only a torque demand from a driver (torque calculated from accelerator opening), but also torque demands from devices of various types as they relate to vehicle control, such as VSC (vehicle stability control system), TRC (traction control system), ABS (antilock brake system), and transmission. The same holds true also with efficiency.

The common signal delivery system 50 delivers common engine information to the demand generation level 10. Each of the demand output elements 12, 14, and 16 refers to the common engine information to thereby determine the demand value to be outputted. This is because specific details of demands vary according to the operating conditions and operating states of the engine. If a catalyst temperature sensor (not shown) is used to measure the catalyst temperature, for example, the demand output element 14 determines necessity to warm the catalyst based on that temperature information and, according to a determination result, outputs a demand for efficiency or air-fuel ratio.

The demand output elements 12, 14, and 16 of the demand generation level 10 output a plurality of demands expressed in torque, efficiency, or air-fuel ratio as described above. All of these demands cannot, however, be achieved completely and simultaneously. This is because only one torque demand can be achieved even with a plurality of torque demands. Similarly, only one efficiency demand can be achieved against a plurality of efficiency demands and only one air-fuel ratio demand can be achieved against a plurality of air-fuel ratio demands. This necessitates a process of mediating the demands.

The mediation level 20 mediates demands (demand values) outputted from the demand generation level 10. The mediation level 20 includes mediation elements 22, 24, and 26, each being dedicated to a corresponding physical quantity as a classified category of demands. The mediation element 22 mediates one demand value expressed in torque with another to arrive at a single torque demand value. The mediation element 24 mediates one demand value expressed in efficiency with another to arrive at a single efficiency demand value. The mediation element 26 mediates one demand value expressed in air-fuel ratio with another to arrive at a single air-fuel ratio demand value. Each of the mediation elements 22, 24, and 26 performs mediation according to a predetermined rule. The rule as the term is herein used means a calculation rule for obtaining a single numeric value from a plurality of numeric values, such as, for example, selecting the maximum value, selecting the minimum value, averaging, or superposition. These calculation rules may be appropriately combined together. Which rule or rules should be applied is left to the design and, as long as the present invention is concerned, there are no restrictions in details of the rules.

Figure 2:
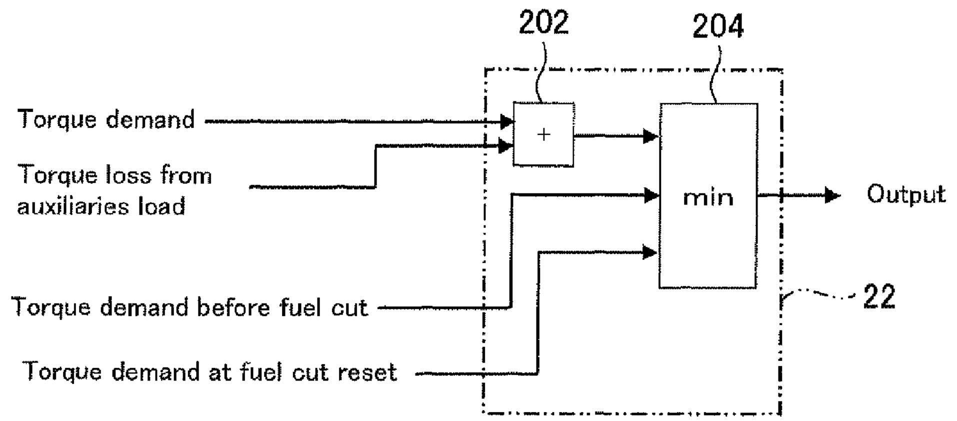
FIG. 2 is a block diagram showing typical arrangements of a mediation element (torque mediation) according to the first embodiment of the present invention.

Specific examples will be given below to enable an even deeper understanding of mediation. FIG. 2 is a block diagram showing typical arrangements of the mediation element 22. In this example, the mediation element 22 includes a superposition element 202 and a minimum value selection element 204. In addition, the demand values collected by the mediation element 22 in this example are a torque demand of the driver, a torque loss from auxiliaries load, a torque demand before fuel cut, and a torque demand at fuel cut reset.

Of the demand values collected by the mediation element 22, the torque demand of the driver and the torque loss from auxiliaries load are superposed one on top of another by the superposition element 202. An output value from the superposition element 202, together with the torque demand before fuel cut and the torque demand at fuel cut reset, is inputted to the minimum value selection element 204 and the minimum value of these is selected. The selected value is outputted from the mediation element 22 as a final torque demand value, specifically, a mediated torque demand value.

Figure 3:
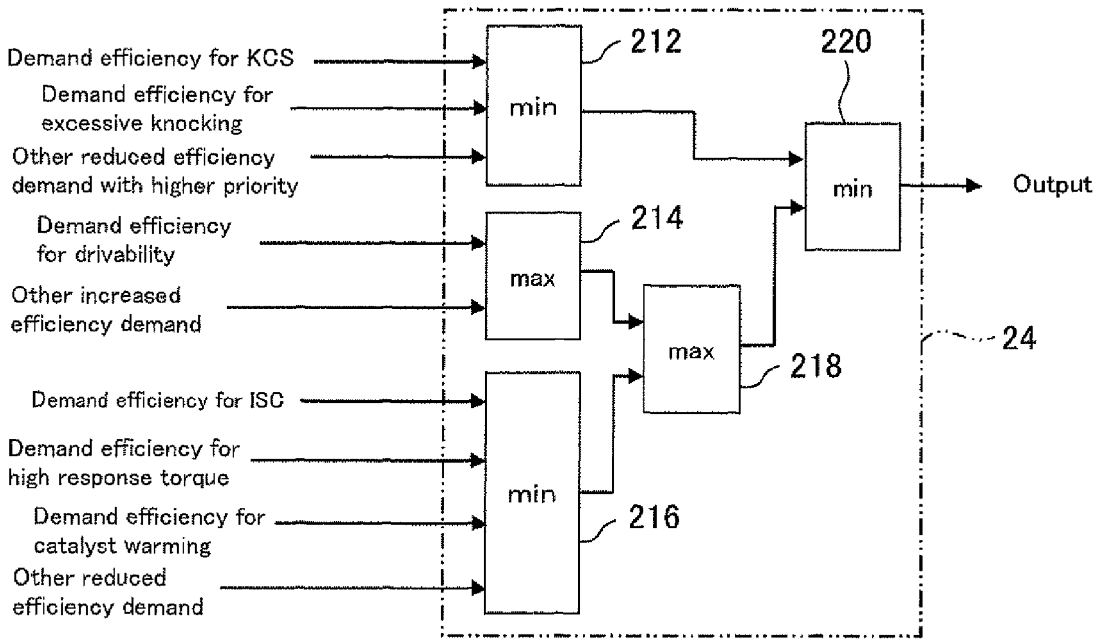
FIG. 3 is a block diagram showing typical arrangements of a mediation element (efficiency mediation) according to the first embodiment of the present invention.

FIG. 3 is a block diagram showing typical arrangements of the mediation element 24. In this example, the mediation element 24 includes three minimum value selection elements 212, 216, and 220 and two maximum value selection elements 214 and 218. In addition, the demand values collected by the mediation element 24 in this example include demand efficiency for drivability as an increased efficiency demand; demand efficiency for ISC, demand efficiency for high response torque, and demand efficiency for catalyst warming as reduced efficiency demands; and demand efficiency for KCS and demand efficiency for excessive knocking as reduced efficiency demands with higher priority.

Of the demand values collected by the mediation element 24, the drivability demand efficiency, together with other increased efficiency demands, is inputted to the maximum value selection element 214. The maximum value of these is inputted to the maximum value selection element 218. Further, the ISC demand efficiency, the high response torque demand efficiency, and the catalyst warming demand efficiency, together with other reduced efficiency demands, are inputted to the minimum value selection element 216. The minimum value of these is then inputted to the maximum value selection element 218. The maximum value selection element 218 selects the maximum value of the input value from the maximum value selection element 214 and the input value from the minimum value selection element 216 and inputs the maximum value to the minimum value selection element 220. The minimum value selection element 220 selects the minimum value of the input value from the maximum value selection element 218 and the input value from the minimum value selection element 212. The selected value is outputted from the mediation element 24 as a final efficiency demand value, specifically, a mediated efficiency demand value.

The same processing is performed also in the mediation element 26, though a specific example is herein omitted. As described earlier, specific types of elements to form the mediation element 26 are left to the design and the elements may be combined as appropriately based on the design concept of the specific designer.

As noted earlier, the common signal delivery system 50 delivers the common engine information also to the mediation level 20. Though the common engine information is not used in the above-described specific examples related to the mediation elements 22, 24, the common engine information can be used in each of the mediation elements 22, 24, and 26. For example, rules for mediation can be altered according to the operating conditions and operating states of the engine. The rules are not, however, altered in consideration of a range to be achieved by the engine as described below.

As evident from the above-described specific examples, the mediation element 22 does not add an upper limit torque or a lower limit torque to be actually achieved by the engine to mediation. Results of mediation by other mediation elements 24 and 26 are not added to the mediation, either. This also holds true with the mediation elements 24 and 26 which perform mediation without adding the upper and lower limits of the range to be achieved by the engine or the results of mediation of other mediation elements. The upper and lower limits of the range to be achieved by the engine vary depending on the operating conditions of the engine and a relationship among torque, efficiency, and air-fuel ratio. Accordingly, an attempt to mediate each demand value with the range to be achieved by the engine invites an increase in the operational load on the computer. Each of the mediation elements 22, 24, and 26 therefore performs mediation by collecting only the demands outputted from the demand generation level 10.

Through the foregoing mediation performed by each of the mediation elements 22, 24, and 26, one torque demand value, one efficiency demand value, and one air-fuel ratio demand value are outputted from the mediation level 20. In the control variable setting level 30 as the next hierarchical level, the control variable of each of the actuators 42, 44, and 46 is set based on these mediated torque demand value, efficiency demand value, and air-fuel ratio demand value.

The control variable setting level 30 includes one adjuster portion 32 and a plurality of control variable calculation elements 34, 36, and 38. The control variable calculation elements 34, 36, and 38 are provided to correspond, respectively, to the actuators 42, 44, and 46. In this embodiment, the actuator 42 is a throttle, the actuator 44 is an ignition device, and the actuator 46 is a fuel injection system. Accordingly, a throttle opening is calculated as the control variable in the control variable calculation element 34 connected to the actuator 42; ignition timing is calculated as the control variable in the control variable calculation element 36 connected to the actuator 44; and a fuel injection amount is calculated as the control variable in the control variable calculation element 38 connected to the actuator 46.

Numeric values used for calculation of the control variables by each of the control variable calculation elements 34, 36, and 38 are supplied from the adjuster portion 32. The torque demand value, the efficiency demand value, and the air-fuel ratio demand value mediated by the mediation level 20 are first subjected to an adjustment in magnitude by the adjuster portion 32. This is because the range to be achieved by the engine is not added to the mediation by the mediation level 20 as described earlier, so that the engine may not be operated properly depending on the magnitude of each demand value.

The adjuster portion 32 adjusts each of the demand values based on a mutual relationship therebetween so that proper operation of the engine can be performed. At levels of hierarchy higher than the control variable setting level 30, each of the torque demand value, the efficiency demand value, and the air-fuel ratio demand value is independently calculated and resultant calculated values are not used or referred to among different elements involved in the calculation. Specifically, the torque demand value, the efficiency demand value, and the air-fuel ratio demand value are mutually referred to for the first time at the adjuster portion 32. If an attempt is made to adjust the magnitude of the demand values at a higher level of hierarchy, the number of subjects of adjustment is large, resulting in heavy operational load. When the adjustment is made at the control variable setting level 30, however, the number of subjects of adjustment is limited to three; specifically, the torque demand value, the efficiency demand value, and the air-fuel ratio demand value, requiring only a small operational load for adjustments.

How the adjustments are made is left to the design and, as long as the present invention is concerned, there are no restrictions in details of the adjustments. If a priority order is involved among the torque demand value, the efficiency demand value, and the air-fuel ratio demand value, however, the demand value with a lower priority should preferably be adjusted (modified). Specifically, the demand value with a high priority is directly reflected in the control variables of the actuators 42, 44, and 46 and the demand value with a low priority is first adjusted and then reflected in the control variables of the actuators 42, 44, and 46. This allows the demand with a high priority to be reliably realized and the demand with a low priority to be realized as much as feasible within a range of enabling proper operations of the engine. For example, if the torque demand value has the highest priority, the efficiency demand value and the air-fuel ratio demand value are corrected with the one having the lower priority of the two being corrected largely. If the priority order changes depending on, for example, the operating conditions of the engine, the priority order is determined based on the common engine information delivered from the common signal delivery system 50, thereby determining which demand value should be corrected.

Figure 4:
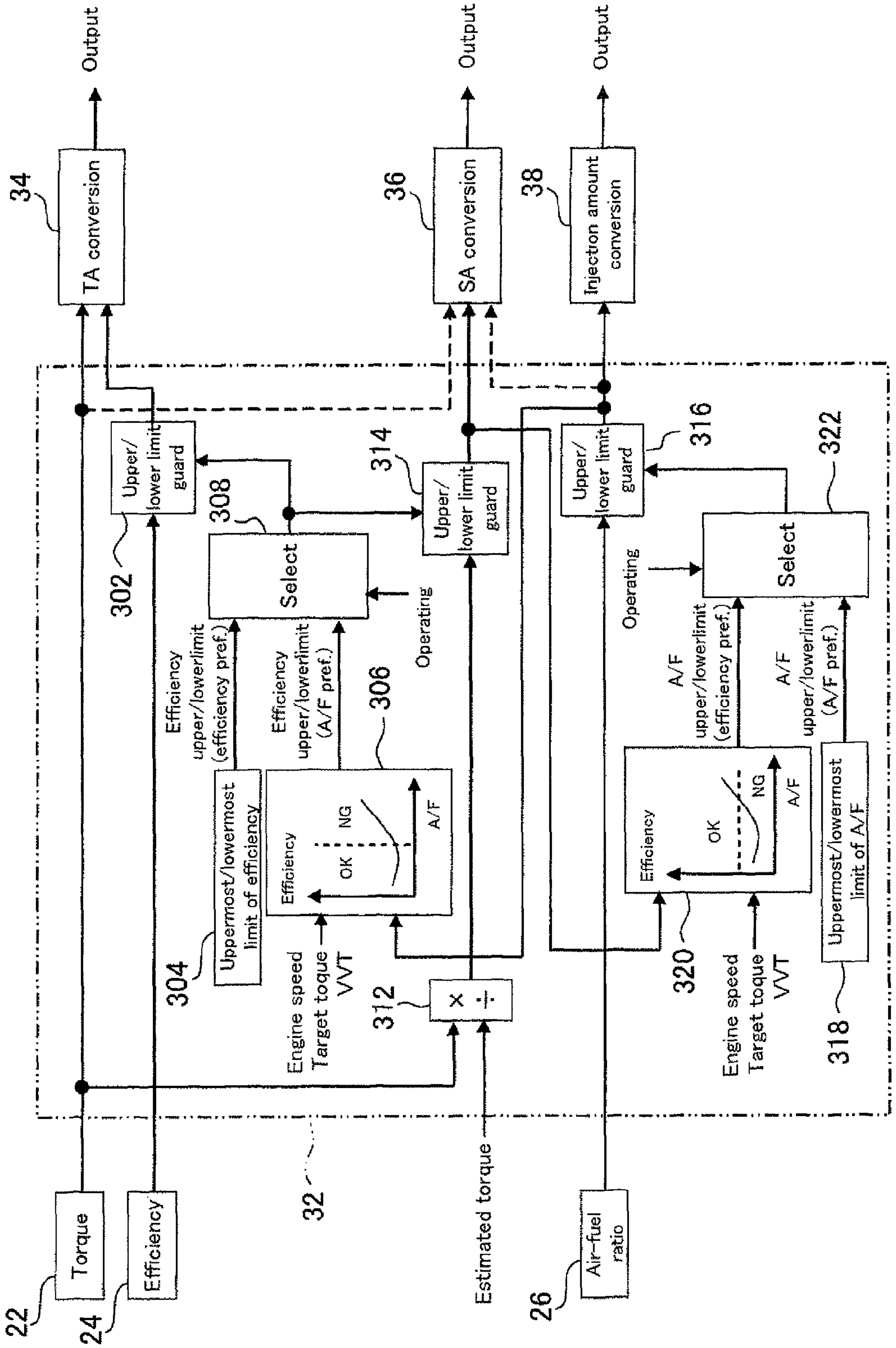
FIG. 4 is a block diagram showing typical arrangements of a adjuster portion according to the first embodiment of the present invention.

Specific examples will be given below to enable an even deeper understanding of the adjuster portion 32. FIG. 4 is a block diagram showing typical arrangements of the adjuster portion 32. In this example, an engine operating mode includes an efficiency preferential mode and an air-fuel ratio preferential mode. Arrangements will be described below that allow the above-mentioned priority order to be changed according to the operating mode. The operating mode is included in the common engine information and delivered to the adjuster portion 32 via the common signal delivery system 50.

In the arrangements shown in FIG. 4, the adjuster portion 32 includes a guard 302 limiting upper and lower limits of the efficiency demand value. The guard 302 corrects the efficiency demand value mediated by the mediation element 24 such that the efficiency demand value falls within the range of enabling proper operations of the engine. The adjuster portion 32 also includes a guard 316 limiting upper and lower limits of the air-fuel ratio demand value. The guard 316 corrects the air-fuel ratio demand value mediated by the mediation element 26 such that the air-fuel ratio demand value falls within the range of enabling proper operations of the engine. The upper and lower limit values of each of the guards 302, 316 are variable so as to be variable in a manner mutually operatively associated with each other. Following describe how it works.

Available for the efficiency upper/lower limit values of the guard 302 are the upper/lower limit values (for the efficiency preferential mode) when the efficiency preferential mode is selected as the operating mode and the upper/lower limit values (for the air-fuel ratio preferential mode) when the air-fuel ratio preferential mode is selected as the operating mode. Changing a limiting range of the guard 302 allows the magnitude of the efficiency demand value to be adjusted. A selector part 308 selects either type of the efficiency upper/lower limit values according to the operating mode and sets the selected efficiency upper/lower limit values in the guard 302.

The efficiency upper/lower limit values for the efficiency preferential mode represent uppermost/lowermost limit values throughout an entire air-fuel ratio range and values stored in a memory 304 are read. The efficiency upper/lower limit values for the air-fuel ratio preferential mode, on the other hand, represent the upper/lower limit values of the efficiency with which knocking and misfire can be avoided at the preferential air-fuel ratio. These values are read from a map 306 based on the operating conditions including an engine speed, a target torque, and valve timing. The air-fuel ratio demand value processed by the guard 316 is inputted to the map 306 and, with reference to this air-fuel ratio demand value, the efficiency upper/lower limit values are determined.

Available for the air-fuel ratio upper/lower limit values of the guard 316 are the upper/lower limit values (for the efficiency preferential mode) when the efficiency preferential mode is selected as the operating mode and the upper/lower limit values (for the air-fuel ratio preferential mode) when the air-fuel ratio preferential mode is selected as the operating mode. Changing a limiting range of the guard 316 allows the magnitude of the air-fuel ratio demand value to be adjusted. A selector part 322 selects either type of the air-fuel ratio upper/lower limit values according to the operating mode and sets the selected air-fuel ratio upper/lower limit values in the guard 316.

The air-fuel ratio upper/lower limit values for the air-fuel ratio preferential mode represent uppermost/lowermost limit values throughout an entire efficiency range and values stored in a memory 318 are read. The air-fuel ratio upper/lower limit values for the efficiency preferential mode, on the other hand, represent the upper/lower limit values of the air-fuel ratio with which knocking and misfire can be avoided at the preferential efficiency. These values are read from a map 320 based on the operating conditions including the engine speed, the target torque, and the valve timing. A torque efficiency processed by a guard 314 to be described later is inputted to the map 320 and, with reference to this torque efficiency, the air-fuel ratio upper/lower limit values are determined. Definition and a calculation method of the torque efficiency will be described later.

Figure 5:
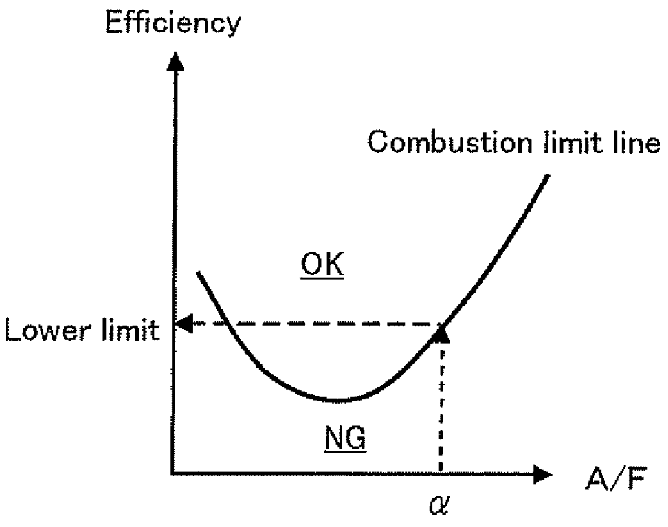
FIG. 5 is a diagram showing a setting method for the efficiency upper/lower limit values considering air-fuel ratio according to the first embodiment of the present invention.
Figure 6:
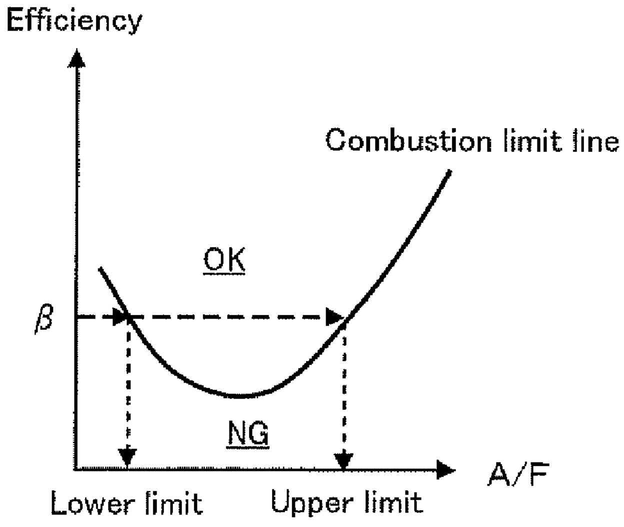
FIG. 6 is a diagram showing a setting method for the air-fuel ratio upper/lower limit values considering efficiency according to the first embodiment of the present invention.

FIG. 5 is a diagram showing a setting method for the efficiency upper/lower limit values using the map 306. FIG. 6 is a diagram showing a setting method for the air-fuel ratio upper/lower limit values using the map 320. In each figure, the ordinate represents the efficiency and the abscissa represents the air-fuel ratio. The curve shown in the figure is a combustion limit line. The area below the combustion limit line is an NG area in which proper operations cannot be performed. The combustion limit line depends on the operating conditions including the engine speed, the target torque, and the valve timing.

First, when the air-fuel ratio preferential mode is selected as the operating mode, an air-fuel ratio demand value α is inputted to the map as shown in FIG. 5. A value of efficiency corresponding to the air-fuel ratio demand value α in the combustion limit line is then calculated. That value is set as the efficiency lower limit value at the air-fuel ratio demand value a. A predetermined value (for example, 1) is used for the efficiency upper limit value. The set efficiency lower limit value and efficiency upper limit value are set in the guard 302 by the selector part 308.

If the efficiency preferential mode is selected as the operating mode, a torque efficiency β is inputted to the map as shown in FIG. 6. A value of air-fuel ratio corresponding to the torque efficiency β in the combustion limit line is then calculated. In the case shown in the figure, two large and small values of the air-fuel ratio corresponding to the torque efficiency β exist, the larger value being set as the air-fuel ratio upper limit value at the torque efficiency β and the smaller value being set as the air-fuel ratio lower limit value at the torque efficiency β. The set air-fuel ratio lower limit value and air-fuel ratio upper limit value are set in the guard 316 by the selector part 322.

Additionally, the adjuster portion 32 can generate a new signal using the demand value inputted from the mediation level 20 and the common engine information delivered from the common signal delivery system 50. In the example shown in FIG. 4, a divider part 312 calculates a ratio between the torque demand value mediated by the mediation element 22 and an estimated torque included in the common engine information. The estimated torque represents torque to be outputted when the ignition timing is MST with the current amount of intake air and air-fuel ratio. The calculation of the estimated torque is performed by another task of the control apparatus.

The ratio between the torque demand value and the estimated torque calculated by the divider part 312 is called torque efficiency. The guard 314 limits the upper and lower limits of the torque efficiency. The efficiency upper/lower limit values selected by the selector part 308 are set in the guard 314. Specifically, the limiting range of this guard 314 is set in the same manner as with the guard 302 that limits the upper/lower limits of the efficiency demand value.

As a result of the foregoing processing, signals outputted from the adjuster portion 32 represent a torque demand value, a corrected efficiency demand value, a corrected air-fuel ratio demand value, and torque efficiency. Of these signals, the torque demand value and the corrected efficiency demand value are inputted to the control variable calculation element 34. The control variable calculation element 34 first divides the torque demand value by the corrected efficiency demand value. Because the corrected efficiency demand value is a value equal to, or less than 1, the torque demand value is corrected to be increased by this division. The corrected to be increased torque demand value is then translated to an amount of air, from which the throttle opening is calculated.

The torque efficiency is inputted as a main signal to the control variable calculation element 36. The torque demand value and the corrected air-fuel ratio demand value are also inputted as reference signals. The control variable calculation element 36 calculates an amount of retard angle relative to the MBT from the torque efficiency. The smaller the torque efficiency, the greater the value of the amount of retard angle. This results in reduction in torque. Inflation of the torque demand value performed by the control variable calculation element 34 is a process of compensating for torque reduction by the retard. In this embodiment, the torque demand value and the efficiency demand value can both be achieved by the retard of the ignition timing based on the torque efficiency and the inflation of the torque demand value based on the efficiency demand value. The torque demand value and the corrected air-fuel ratio demand value inputted to the control variable calculation element 36 are used for selecting the map for converting torque efficiency to the amount of retard angle. The final ignition timing is then calculated from the amount of retard angle and the MBT (or a basic ignition timing).

The corrected air-fuel ratio demand value is inputted to the control variable calculation element 38. The control variable calculation element 38 calculates the fuel injection amount from the corrected air-fuel ratio demand value and the amount of intake air into a cylinder. The amount of intake air is included in the common engine information and delivered to the control variable calculation element 38 from the common signal delivery system 50.

As described heretofore, in the control apparatus according to the embodiment, the demand outputted from the demand generation level 10 on the highest level of hierarchy is transmitted to the control variable setting level 30 on the lowest level of hierarchy in one direction. This eliminates transfer of signals among the levels 10, 20, and 30 of different levels of hierarchy, requiring less calculation load on the computer. In addition, the common engine information is delivered parallel to each of the levels 10, 20, and 30 by the common signal delivery system 50. This helps suppress signal transmission load among the levels 10, 20, and 30.

Further, in the control apparatus of this embodiment, each of the demand values transmitted to the control variable setting level 30 is adjusted based on the relation thereof relative to each other and the control variable of each of the actuators 42, 44, and 46 is calculated based on the adjusted demand value. This allows the actuators 42, 44, and 46 to be coordinated with each other so that engine operations will not be deteriorated even with a demand of any kind outputted from the demand generation level 10. Specifically, according to the control apparatus of the embodiment, a plurality of demands related to capabilities of various types can be appropriately achieved without increasing the operational load on the computer.

Second Embodiment

A second embodiment of the present invention will be described below with reference to drawings. The second embodiment of the present invention will be described, in which the control apparatus of the present invention is applied to a general vehicle drive unit. The vehicle drive unit to which the embodiment is to be applied includes, for example, an engine, an electric motor, and a hybrid system having an engine and an electric motor.

Figure 7:
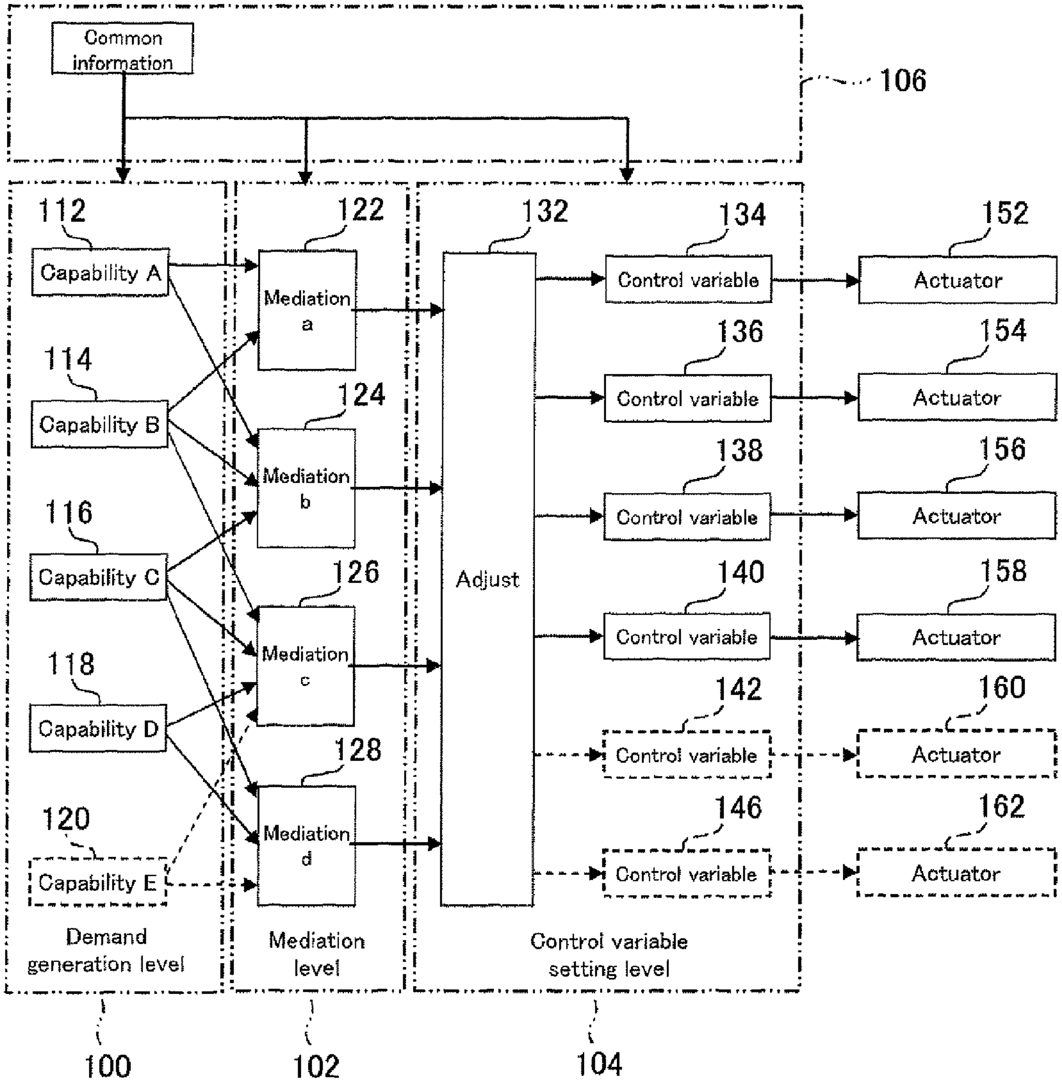
FIG. 7 is a block diagram illustrating the configuration of a control apparatus of a vehicle drive unit according to a second embodiment of the present invention.

The control apparatus of the vehicle drive unit according to the second embodiment of the present invention is structured as shown by a block diagram of FIG. 7. FIG. 7 shows various elements of the control apparatus in blocks and transmission of signals between the blocks by arrows. Referring to this figure, the control apparatus has a control structure of a hierarchical type including three levels of hierarchy 100, 102, and 104. The control apparatus further includes a common signal delivery system 106 that is disposed independently of the three levels 100, 102, and 104 and delivers a common signal parallel to each of the levels 100, 102, and 104.

A demand generation level 100 of the highest level of hierarchy includes a plurality of demand output elements 112, 114, 116, and 118 provided for capabilities A, B, C, and D of the vehicle drive unit, respectively. Each of the demand output elements 112, 114, 116, and 118 outputs a numerical value that represents the demand related to the corresponding capability of the vehicle drive unit. More specifically, the numerical value represents a physical quantity related to an operation of the vehicle drive unit, outputted by being represented by any of a plurality of predetermined physical quantities a, b, c, and d.

A mediation level 102 includes mediation elements 122, 124, 126, and 128, each being dedicated to a corresponding physical quantity a, b, c, or d as a classified category of demands. Each of the mediation elements 122, 124, 126, and 128 collects the demand value expressed in the physical quantity of which the mediation element is in charge, of the demand values outputted from the demand generation level 100. Each of the mediation elements 122, 124, 126, and 128 performs mediation according to a predetermined rule. The rule may be, for example, selection of the maximum value or selection of the minimum value, or any other that is not limited. As a result of mediation performed by each of the mediation elements 122, 124, 126, and 128, one demand value is outputted from the mediation level 102 for each of the physical quantities a, b, c, and d.

A control variable setting level 104 of the lowest level of hierarchy includes one adjuster portion 132 and a plurality of control variable calculation elements 1334, 136, 138, and 140. Each of the demand values outputted from the mediation level 102 is first processed by the adjuster portion 132. The adjuster portion 132 adjusts each of the demand values based on a mutual relationship therebetween so that proper operation of the vehicle drive unit can be performed. The demand values to be adjusted are limited to the number of types of the physical quantities a, b, c, and d representing classified categories of demands. As compared with a case in which the adjustments are made at a higher level of hierarchy in which many demand values exist, therefore, a smaller operational load is required for the adjustments. Additionally, the adjuster portion 132 also generates a new signal using the demand value inputted from the mediation level 102 and the common information delivered from the common signal delivery system 106.

The control variable calculation elements 134, 136, 138, and 140 are provided to correspond, respectively, to actuators 152, 154, 156, and 158. Signals supplied from the adjuster portion 132 to the control variable calculation elements 134, 136, 138, and 140 include those generated from the demand values and the common information, in addition to the adjusted demand values. Each of the control variable calculation elements 134, 136, 138, and 140 calculates the control variable of a corresponding one of the actuators 152, 154, 156, and 158 using the signal supplied from the adjuster portion 132.

As is known from the foregoing description, in the control apparatus according to the embodiment, the demand outputted from the demand generation level 100 on the highest level of hierarchy is transmitted to the control variable setting level 104 on the lowest level of hierarchy in one direction. In addition, the common information is delivered parallel to each of the levels 100, 102, and 104 by the common signal delivery system 106. Suppressing signal transmission load among the levels 100, 102, and 104 in this manner helps minimize the operational load on the computer.

Additionally, in the control apparatus of this embodiment, each of the demand values mediated by the mediation level 102 is adjusted based on the relationship between each other by the control variable setting level 104 and the control variable of each of the actuators 152, 154, 156, and 158 is calculated based on the adjusted demand value. This allows the actuators 152, 154, 156, and 158 to be coordinated with each other such that operation of the vehicle drive unit is not deteriorated.

Further, according to the control apparatus of this embodiment, there is an effect that the capability to be achieved can be easily added. When, for example, a new capability E is to be added, a demand output element 120 corresponding thereto is simply additionally disposed in the demand generation level 100 as indicated by a dotted line in the figure. An arrangement should, however, be invariably made so that a demand value expressed in a predetermined any one of the physical quantities a, b, c, and d is to be outputted to the demand output element 120 to be newly added. If the demand value outputted by the demand output element 120 is expressed in a physical quantity c or d, the demand output element 120 is to be connected to the mediation element 126 or 128.

Signals are transmitted from the demand generation level 100 to the mediation level 102 in one direction and, moreover, no signals are transmitted between the elements within the same level of hierarchy at the demand generation level 100. Addition of the new demand output element 120 does not therefore change the design of other elements. The demand value outputted from the added demand output element 120 and those outputted from other demand output elements are collected and mediated to a single demand value by the mediation elements 126 and 128.

Each of the mediation elements 126 and 128 is only to perform mediation according to a predetermined rule, so that an increase in the number of demand values to be collected results in only a slight increase in the operating load involved therewith. In addition, because there is no change in the number of demand values outputted from the mediation level 102 to the control variable setting level 104, there is no chance of increasing the operating load of the control variable setting level 104. Specifically, according to the control apparatus of the embodiment, the capability of the vehicle drive unit to be achieved can be added without allowing the operating load of the computer to increase.

Additionally, according to the control apparatus of the embodiment, the actuator used for controlling the vehicle drive unit can be easily added. For example, to add new actuators 160 and 162 as indicated by the dotted line in the figure, it is necessary only to add newly control variable calculation elements 142 and 146 corresponding thereto to the control variable setting level 104 and connect the same to the adjuster portion 132. Signals are transmitted from the adjuster portion 132 to each of the control variable calculation elements in one direction and, moreover, no signals are transmitted between the control variable calculation elements, so that there is no change in the design of other elements that would otherwise be necessary as a result of the addition of the new control variable calculation elements 142 and 146.

Miscellaneous

While the present invention has been described with reference to the embodiments, it will be understood by those skilled in the art that the present invention is not limited to the above-described embodiments and various changes in form and detail may be made therein without departing from the spirit and scope of the invention. For example, the following modifications are possible.

In the above-described embodiments, the signals (common information) related to the operating conditions and operating states of the vehicle drive unit are delivered through the common signal delivery system. These signals may, instead, be delivered together with the demand values through the hierarchical levels from a higher level to a lower level of hierarchy. In this case, there is an increased volume of signal transmission between the levels of hierarchy as compared with the case of using the common signal delivery system; however, because the signals are transmitted in one direction only, the operating load can be prevented from becoming excessively large.

In addition, if the present invention is applied to the engine, the types of actuators to be controlled are not limited to the throttle, ignition device, and the fuel injection system. For example, a variable valve timing device (VVT), a variable valve lift device (VVL), and an external EGR device may be the actuators to be controlled. In an engine having a cylinder deactivation mechanism or a compression ratio variable mechanism, these mechanisms may be actuators to be controlled. In an engine having a motor-assisted turbocharger (MAT), the MAT may be used as the actuator to be controlled. Further, engine outputs can be controlled indirectly through auxiliaries driven by the engine, such as an alternator, and these auxiliaries may be used as the actuators.

The invention claimed is:

1. A control apparatus for a vehicle drive unit achieving demands related to various types of capabilities of the vehicle drive unit by coordinately controlling a plurality of actuators related to operations of the vehicle drive unit, the control apparatus having a control structure of a hierarchical type, the control structure comprising:

a demand generation level;

a mediation level disposed on a level lower than the demand generation level; and a control variable setting level disposed on a level lower than the mediation level, signals being transmitted in one direction from a higher level of hierarchy to a lower level of hierarchy, wherein:

the demand generation level includes multiple demand output elements, each of which is associated with any one of the various types of capabilities of the vehicle drive unit, and outputs one or more demands related to an associated type of capability, each of the demands falling into any one of predetermined multiple demand categories, the mediation level includes multiple mediation elements, each of which is assigned to a single demand category among the predetermined multiple demand categories, and collects the one or more demands falling into an assigned category, and mediates the collected one or more demands into a single demand according to a predetermined rule, and the control variable setting level includes an adjuster portion adjusting the values of mediated demands based on a relationship between the mediated demands, and includes multiple control variable calculation elements, each of which is assigned to a single actuator among the plurality of actuators, and calculates a control variable of an assigned actuator based on at least one of the mediated demands and adjusted demands, each of the mediated demands and the adjusted demands being used to calculate at least one control variable of the plurality of actuators.

2. The control apparatus for the vehicle drive unit according to claim 1, wherein a control variable calculation element is provided for each of the actuators.

3. The control apparatus for the vehicle drive unit according to claim 1, further comprising a common signal delivery system delivering a common signal parallel to each of the demand generation, mediation, and control variable setting levels, wherein signals related to operating conditions and operating states of the vehicle drive unit are delivered through the common signal delivery system.

4. The control apparatus for the vehicle drive unit according to claim 1, wherein:

the demand output elements are structured to output the demand related to a corresponding capability of the vehicle drive unit expressed in any of a predetermined plurality of physical quantities related to operations of the vehicle drive unit, and the mediation element is provided for each of the physical quantities and structured to collect, of the demand values outputted from the demand generation level, a demand value expressed in a physical quantity of which the mediation element is in charge.

5. The control apparatus for the vehicle drive unit according to claim 4, wherein:

the vehicle drive unit is an internal combustion engine, and the plurality of physical quantities comprises torque, efficiency, and an air-fuel ratio.

6. The control apparatus for the vehicle drive unit according to claim 5, wherein the adjuster portion adjusts, of a torque demand value, an efficiency demand value, and an air-fuel ratio demand value mediated by the mediation level, the efficiency demand value or the air-fuel ratio demand value.

7. The control apparatus for the vehicle drive unit according to claim 5, wherein the various types of capabilities include a capability related to drivability, a capability related to an exhaust gas, and a capability related to fuel economy.

8. The control apparatus for the vehicle drive unit according to claim 5, wherein the plurality of actuators include an actuator adjusting an amount of intake air of the internal combustion engine, an actuator adjusting ignition timing of the internal combustion engine, and an actuator adjusting a fuel injection amount of the internal combustion engine.

9. The control apparatus for the vehicle drive unit according to claim 1, wherein:

a priority order is previously established between at least two demand values of a plurality of demand values mediated by the mediation level, and the adjuster portion adjusts at least one demand value in ascending order of the priority order such that a relationship among the plurality of demand values used for calculation of the control variable by the control variable calculation element is one that permits proper operations of the vehicle drive unit.

10. The control apparatus for the vehicle drive unit according to claim 9, wherein the vehicle drive unit offers a plurality of operating modes from which to choose, and the priority order is changed according to a selected operating mode.

11. The control apparatus for the vehicle drive unit according to claim 10, wherein the adjuster portion includes a guard limiting an upper limit and/or a lower limit of the demand value to be adjusted, and a limiting range of each guard is changed according to the priority order of each demand value to be adjusted.

* * * * *